(12) United States Patent
Paroli

(10) Patent No.: US 6,422,970 B1
(45) Date of Patent: Jul. 23, 2002

(54) MONOLITHIC SPIDER FOR EPICYCLIC REDUCTION UNIT

(75) Inventor: Nazzaro Paroli, Quattro Castella (IT)

(73) Assignee: Intertechnology Product Development B.V. (NL)

( * ) Notice: Subject to any disclaimer, the term of this patent is extended or adjusted under 35 U.S.C. 154(b) by 0 days.

(21) Appl. No.: 09/449,898

(22) Filed: Nov. 30, 1999

(30) Foreign Application Priority Data

Nov. 30, 1998 (IT) .......................... BO98A0673

(51) Int. Cl.[7] ............................... F16H 57/08
(52) U.S. Cl. ....................................... 475/331
(58) Field of Search ....................... 475/348, 337, 475/331; 384/569

(56) References Cited

U.S. PATENT DOCUMENTS

| | | | | | |
|---|---|---|---|---|---|
| 1,768,225 A | * | 6/1930 | Whitney | ............... | 475/348 X |
| 3,154,970 A | | 11/1964 | Gebhardt et al. | ........... | 475/331 |
| 3,906,818 A | * | 9/1975 | Benthake et al. | ....... | 475/348 X |
| 4,415,378 A | | 11/1983 | McKinney et al. | ........ | 148/12.1 |
| 4,424,879 A | * | 1/1984 | Sonzogni | ................ | 475/331 X |
| 5,302,160 A | * | 4/1994 | Fujioka | ....................... | 475/348 |
| 5,769,751 A | * | 6/1998 | Forster | ...................... | 475/346 |
| 6,033,333 A | * | 3/2000 | Muraki et al. | .............. | 475/178 |

FOREIGN PATENT DOCUMENTS

| | | | |
|---|---|---|---|
| DE | 4216402 A1 | * | 5/1992 |
| DE | 19608134 | | 9/1997 |
| DE | 19711423 C1 | * | 9/1998 |
| JP | 58077952 | | 11/1983 |

* cited by examiner

Primary Examiner—Charles A. Marmor
Assistant Examiner—Ankur Parekh
(74) Attorney, Agent, or Firm—Webb Ziesenheim Logdson Orkin & Hanson, P.C.

(57) ABSTRACT

A spider for an epicyclic reduction unit including planetary gear supporting pivots which protrude from a flange. The pivots are monolithic, or integral with the flange and having a surface for the rolling of rolling bodies of bearings for supporting planetary gears which has a high level of hardness achieved by a thermal treatment for surface hardening.

10 Claims, 3 Drawing Sheets

MONOLITHIC SPIDER FOR EPICYCLIC REDUCTION UNIT

BACKGROUND OF THE INVENTION

1. Field of the Invention

The present invention relates to a monolithic spider for an epicyclic reduction unit.

2. Background Information

Epicyclic or sun-and-planet reduction units are known in which reduction of the rpm rate between the input or driving shaft and the output or driven shaft is achieved by a gear system having a plurality of reduction stages, each of which is substantially composed of a central pinion meshing with a set of three planetary gears that are rotatably supported on respective pivots cantilevered out from a flange. The flange and its associated assembly is known as a spider.

The planetary gears are supported on the pivots by smooth or rolling bearings. The bearings are composed of two concentric rings which form the tracks for the travel of the rolling bodies (rollers or balls) of the bearings. In the case of rolling bearings, designs have increased the load-bearing capacity of the pivots and therefore their resistance to the mechanical stresses that occur during operating conditions without increasing the external dimensions of the bearings. Specifically, it has been known to eliminate the internal contrast ring of the bearing and to provide a suitable treatment of the outer surface of the pivots in order to make it more suitable to withstand the wear of the rolling bodies.

This treatment is currently performed on pivots which are separate from the spider and are therefore fixed to the flange of the spider after the treatment has been completed.

Accordingly, although this solution allows for stronger pivots, it requires a more complicated and expensive process and necessarily entails operations for fitting the pivots to the flange. This results in additional burdens in terms of materials and machining, such as the provision of seating holes in the spider flange, threaded tangs on the pivots which are adapted to be inserted in the seating holes of the flange and are fixed by nuts and washers, and treatments for finishing the various parts.

SUMMARY OF THE INVENTION

The object of the present invention is to obviate the above-cited drawbacks of conventional devices, i.e., to provide a monolithic spider for an epicyclic reduction unit which allows to obtain a structure which is simple and has a minimum number of parts that are subject to wear.

The present invention achieves the above object with a structure which is simple, relatively easy to provide in practice, safe in use, effective in operation and has a relatively low cost.

These and other objects and advantages of the present invention will become apparent hereinafter and are achieved by the spider for an epicyclic reduction unit according to the present invention. The present invention is provided with planetary gear supporting pivots which protrude from a flange, wherein the pivots are monolithic, or integral with the flange and have a surface for the rolling of rolling bodies of bearings for supporting planetary gears having a high level of hardness achieved by a thermal treatment for surface hardening.

BRIEF DESCRIPTION OF THE DRAWINGS

Further characteristics and advantages of the present invention will become apparent from the following detailed description of a preferred, but not exclusive embodiment of a monolithic spider for an epicyclic reduction unit. The present invention is illustrated only by way of non-limitative example in the accompanying drawings, wherein.

DESCRIPTION OF THE PREFERRED EMBODIMENTS

Figure 1:
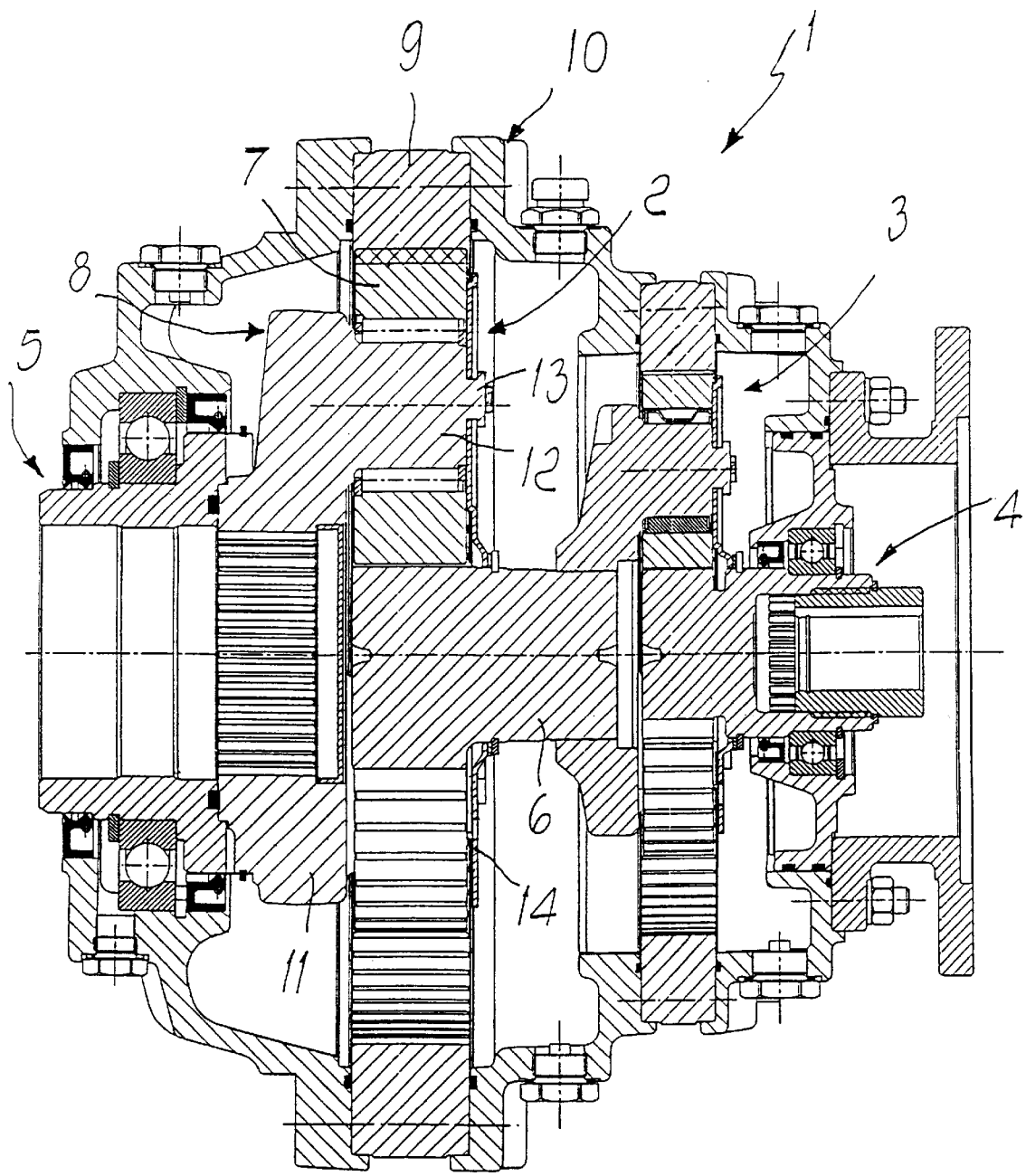
FIG. 1 is a sectional view of an epicyclic reduction unit including a spider according to the present invention.
Figure 2:
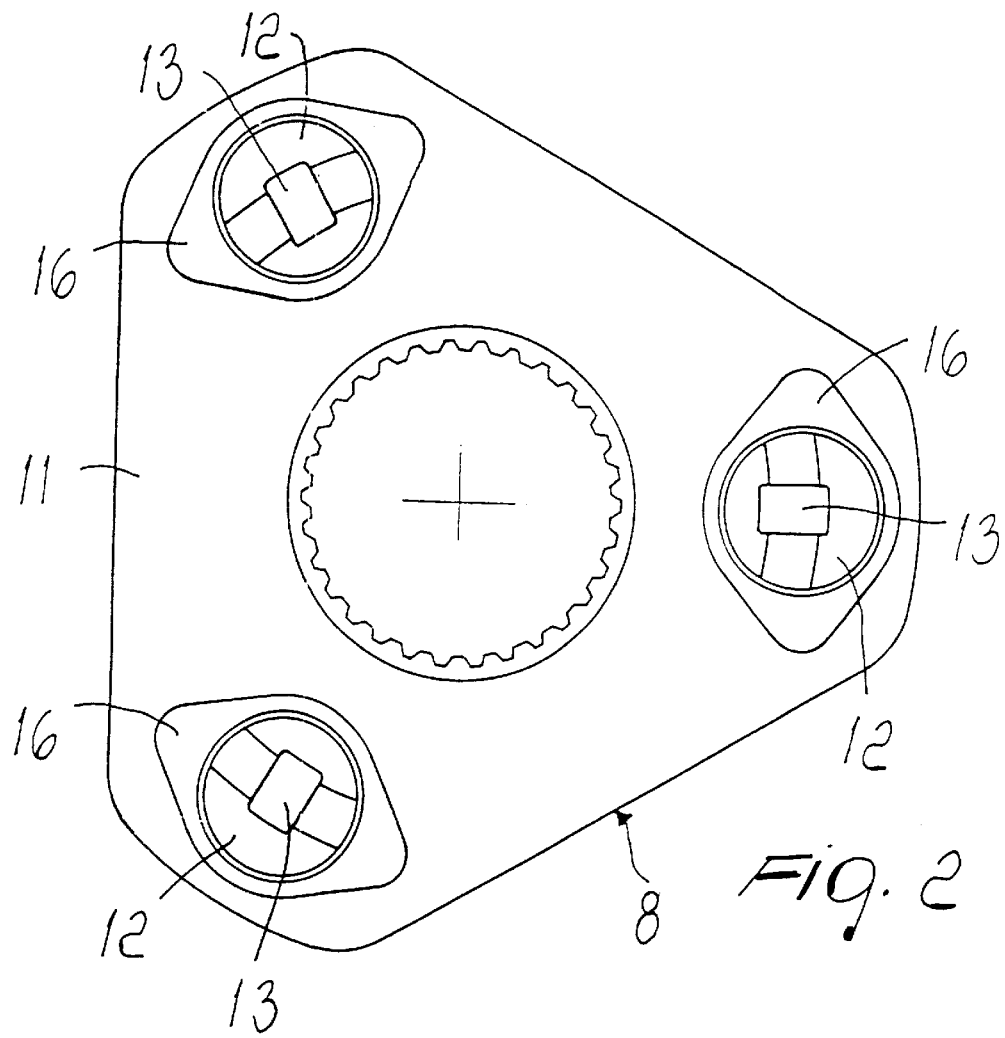
FIG. 2 is a front view of the spider of FIG. 1.
Figure 3:
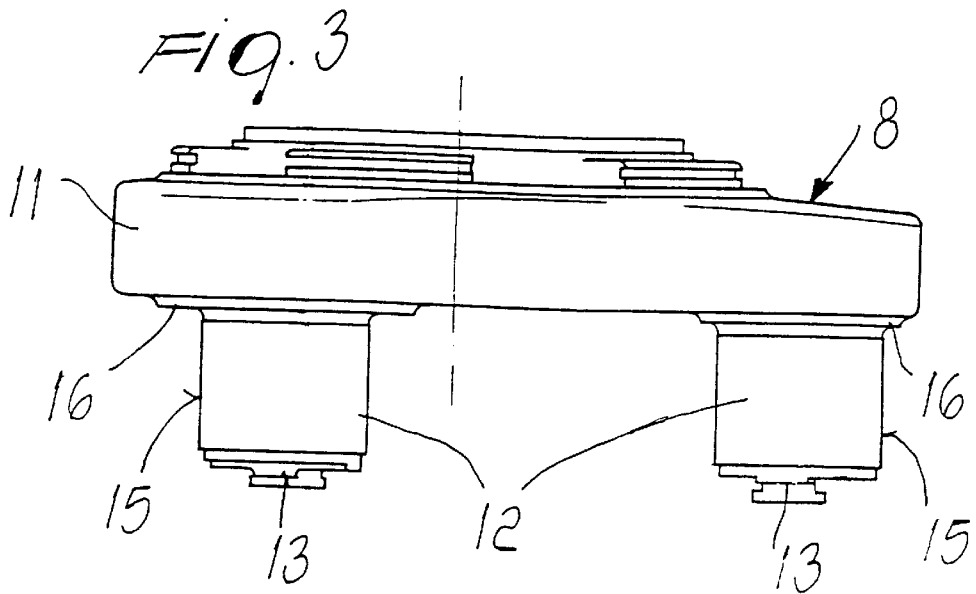
FIG. 3 is a side view of the spider of FIG. 1.
Figure 4:
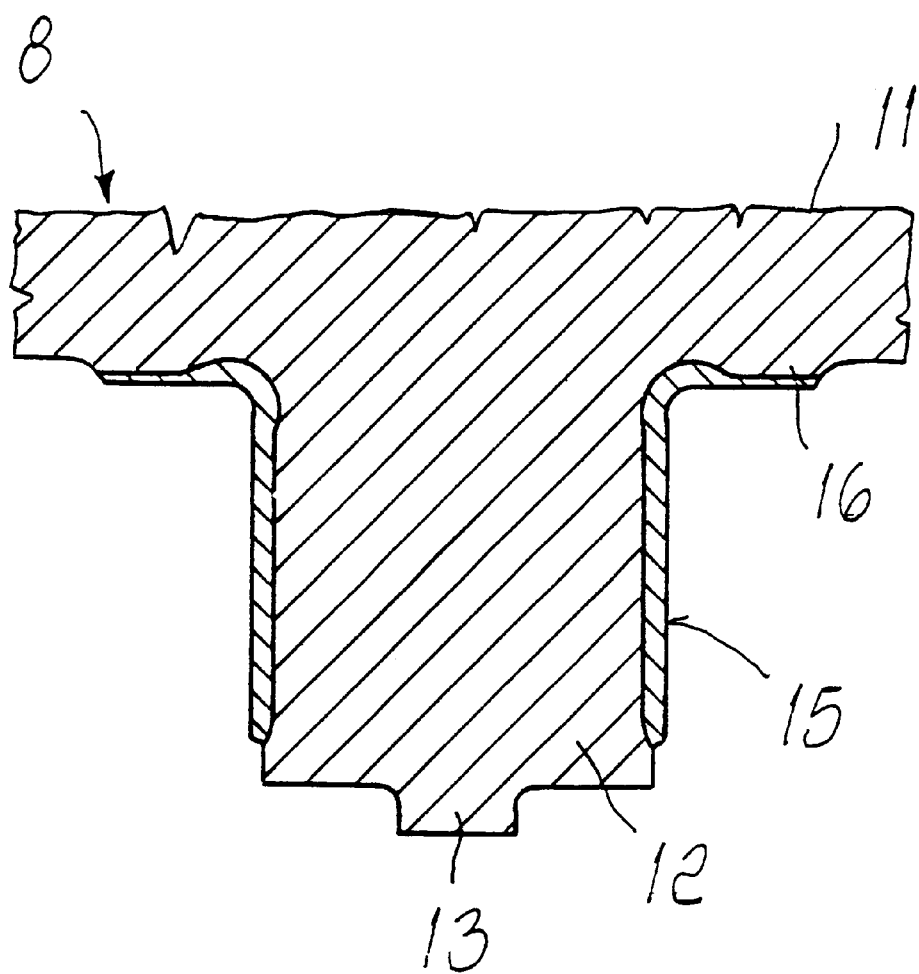
FIG. 4 is a sectional view of a pivot of the spider of FIG. 1 after treatment.

In order to better clarify the subject of the invention, reference is made to an epicyclic reduction unit 1 having a conventional structure comprising two reduction stages 2 and 3 which are interposed between a shaft 4, which may be an input shaft, and a shaft 5, which may be an output shaft.

Each stage 2 and 3 is composed of a central pinion 6 (the reference numerals designate only the parts of the stage 2), which is engaged with a set of three planetary gears 7. The planetary gears 7 are supported by a spider 8 and mesh with a ring gear 9 which is rigidly coupled to a casing 10 of the reduction unit 1.

The spider 8 is formed by a flange 11 at the center of which the shaft 5 is rotationally coupled and from which three pivots 12 cantilever out. The pivots 12 are formed monolithically, or integrally with the flange 11 and the planetary gears 7 are fitted thereon. The free end of each pivot 12 is provided with mushroom-shaped elements 13 which holds a plate 14 for retaining the planetary gears 7 rigidly coupled to the pivots 12.

The cylindrical surface 15 of the pivots 12 has increased hardness and strength characteristics with respect to the inner core of the pivots. The depth of the portion having increased hardness and strength characteristics is preferably 2–4 mm, however the present invention is not limited to this range. These characteristics can be achieved by an induction hardening treatment.

Advantageously, the hardening treatment also affects a region which surrounds the pivots 12 and affects an annular raised portion 16 which protrudes from the face of the flange 11.

As clearly shown, the spider 8 according to the invention fully achieves the intended aim and object. The pivots 12, once they have been subjected to a surface hardening treatment, in fact offer a perfect rolling track for rolling bodies, which can fully replace the inner ring of conventional bearings. The surface treatment allows to preserve the characteristics of internal toughness and consequent resistance to mechanical stresses of the pivots 12.

In the practical embodiment of the invention, the hardening methods may vary according to requirements. Thus, for example, in addition to known induction hardening methods it is possible to use casehardening or carbonitriding.

It will be apparent to those of ordinary skill in the art that various modifications may be made to the present invention without departing from the spirit and scope thereof. The embodiment described is intended to be illustrative of the present invention and not restrictive thereof. The scope of the present invention is defined by the appended claims and equivalents thereof.

What is claimed is:

1. A spider for an epicyclic reduction unit, provided with planetary gear supporting pivots which protrude from a flange, wherein said pivots are monolithic with said flange and each pivot has a surface for the rolling of rolling bodies of bearings for supporting a planetary gear, said surface has an increased level of hardness achieved by a thermal treatment for surface hardening, wherein said thermal treatment affects a region on said flange which surrounds each pivot including an annular raised portion which protrudes from a face of said flange.

2. The spider according to claim 1, wherein said thermal treatment for surface hardening is an induction treatment.

3. The spider according to claim 1, wherein said thermal treatment for surface hardening affects a surface region which has a depth of 2 to 4 mm.

4. A method of forming a spider for an epicyclic reduction unit comprising the steps of:
   a) providing a spider having planetary gear supporting pivots extending from a flange, wherein said pivots are integral with said flange, said pivots each having a surface for rolling of bearings; and
   b) thermally treating said surface of each pivot for surface hardening and a region on said flange which surrounds each pivot including an annular raised portion which protrudes from a face of said flange.

5. The method according to claim 4, wherein the step of thermally treating the surface of each pivot is performed by induction.

6. The method according to claim 4, wherein the step of thermally treating the surface of each pivot affects a surface region which has a depth of 2 to 4 mm.

7. An epicyclic reduction unit comprising:

an input shaft;

an output shaft; and at least one reduction stage between the input shaft and the output shaft, wherein each reduction stage includes a central pinion engaged with a plurality of planetary gears that are engaged with a ring gear, the planetary gears supported on a spider, wherein the spider is formed by a flange which includes a plurality of integral supporting pivots protruding from the flange for mounting the planetary gears, and wherein an outer surface of each pivot is surface hardened by thermally treating the outer surface of each pivot, thereby providing a rolling track for rolling bodies rotationally supporting one of the planetary gears, wherein the spider of each reduction unit includes a plurality of annular raised portions surrounding the pivots wherein each annular raised portion is surface hardened by the thermal treatment of the outer surface of the corresponding pivot.

8. The reduction unit of claim 7, wherein the thermal treatment is an induction treatment.

9. The reduction unit of claim 8, wherein the thermal treatment affects the surface of each pivot to a depth of 2 to 4 mm.

10. The reduction unit of claim 7, wherein the thermal treatment affects the surface of each pivot to a depth of 2 to 4 mm.

* * * * *

UNITED STATES PATENT AND TRADEMARK OFFICE
CERTIFICATE OF CORRECTION

PATENT NO. : 6,422,970 B1
DATED : July 23, 2002
INVENTOR(S) : Nazzaro Paroli

It is certified that error appears in the above-identified patent and that said Letters Patent is hereby corrected as shown below:

<u>Column 4,</u>
Line 21, "surface of the" should read -- surface of its --.

Signed and Sealed this

Twenty-eighth Day of January, 2003

JAMES E. ROGAN
*Director of the United States Patent and Trademark Office*